(12) United States Patent
Ramirez (10) Patent No.: US 8,972,866 B2
(45) Date of Patent: Mar. 3, 2015

(54) OUTBOUND HUNT GROUPS

(75) Inventor: Richard Andrew Ramirez, Meadows Place, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 506 days.

(21) Appl. No.: 13/188,708

(22) Filed: Jul. 22, 2011

(65) Prior Publication Data

US 2013/0024776 A1 Jan. 24, 2013

(51) Int. Cl.
*G06F 3/00* (2006.01)
*H04M 1/2745* (2006.01)
*H04M 3/46* (2006.01)

(52) U.S. Cl.
CPC ............ *G06F 3/00* (2013.01); *H04M 1/274575* (2013.01); *H04M 3/46* (2013.01)
USPC .................. 715/739; 379/201.01; 379/211.01

(58) Field of Classification Search
CPC ............ G06F 3/00; G06F 3/067; H04M 3/54; H04M 3/436
USPC ......... 715/739; 379/201, 211, 201.01, 211.01
See application file for complete search history.

(56) References Cited

U.S. PATENT DOCUMENTS

| | | | |
|---|---|---|---|
| 5,802,160 A * | 9/1998 | Kugell et al. ............ | 379/211.04 |
| 2002/0110231 A1* | 8/2002 | O'Neal et al. ........... | 379/201.01 |
| 2006/0009249 A1* | 1/2006 | Fu et al. ........................ | 455/518 |
| 2006/0062358 A1* | 3/2006 | Pearson et al. ............... | 379/88.2 |
| 2007/0064909 A1* | 3/2007 | Levy et al. ............... | 379/211.03 |
| 2008/0057926 A1* | 3/2008 | Forstall et al. ............... | 455/415 |
| 2008/0140788 A1* | 6/2008 | Carter et al. .................. | 709/206 |
| 2010/0190467 A1* | 7/2010 | Scott et al. ................ | 455/404.2 |
| 2011/0320534 A1* | 12/2011 | Wallace et al. ............... | 709/204 |

* cited by examiner

*Primary Examiner* — Anil Bhargava (57) ABSTRACT

A system may include a communications device configured to select a contact from an address book, the contact including information descriptive of a user and including at least one address of the user. The communications device may be further configured to associate an outbound hunt group with the contact, the outbound hunt group configured to provide a list of addresses to be called in sequence to locate the user.

21 Claims, 10 Drawing Sheets

OUTBOUND HUNT GROUPS

BACKGROUND

Communications devices such as cellular telephones or tablets devices may access address books including names and numbers of a user's contacts. When attempting to initiate a communication with one of the user's contact, the user may select a contact from the address book, rather having to remember and type in an address for the contact each time.

DETAILED DESCRIPTION

When an originating user wishes to establish a communications session with another user, the originating user may select a contact from the address book to invite the selected contact to a communications session. The contact receiving the invitation may accept the request, such as by answering a telephone call, and the communications session may accordingly be established.

Creation of the communications session may not always be successful, however. Sometimes, the other user may not notice an invitation to a communications session. Other times, the other user may notice the invitation but be unable (or unwilling) to respond. If creation of the communication session is unsuccessful, the originating user may attempt to establish a communications session with a third user who may be able to inform the originating user of the whereabouts of the user to be contacted. If the creation of the communication session using the different address is still unsuccessful, the originating user may make additional attempts to the same or other addresses. Alternately, the originating user may simply give up on establishing a communications session and may opt to leave a message or try again later.

An outbound hunt group may specify a list of addresses or contacts to be called when attempting to reach a particular user. The outbound hunt group may further specify an order in which the list of addresses or contacts may be called. As opposed to a traditional hunt group designed to distribute phone calls received by a single telephone number, an outbound hunt group may provide a list of addresses to be called in sequence to locate a particular user.

A communications device may be configured to take advantage of the information included in the caller's address book and allow the user to create the outbound hunt group using the caller's contacts. In some examples, the communications device may be configured to allow the user to determine an order to cycle through the list of addresses or contacts in the outbound hunt group.

A user may select to use an outbound hunt group when attempting to establish a communications session with a contact. By using the outbound hunt group, the user no longer is required to call and disconnect from various users when attempting to locate the contact. Accordingly, outbound hunt groups may provide for a better user experience when initiating a communications session.

Session Initiation Protocol (SIP) is a signaling and call setup protocol defined by the Internet Engineering Task Force (IETF) as Request for Comments (RFC) standard 3261. SIP is often used as the signaling protocol for the setup and control of communication sessions. While some examples illustrated herein utilize SIP signaling and devices, the present disclosure is not limited to SIP and other types of communications devices and protocols may be utilized as well.

Figure 1:
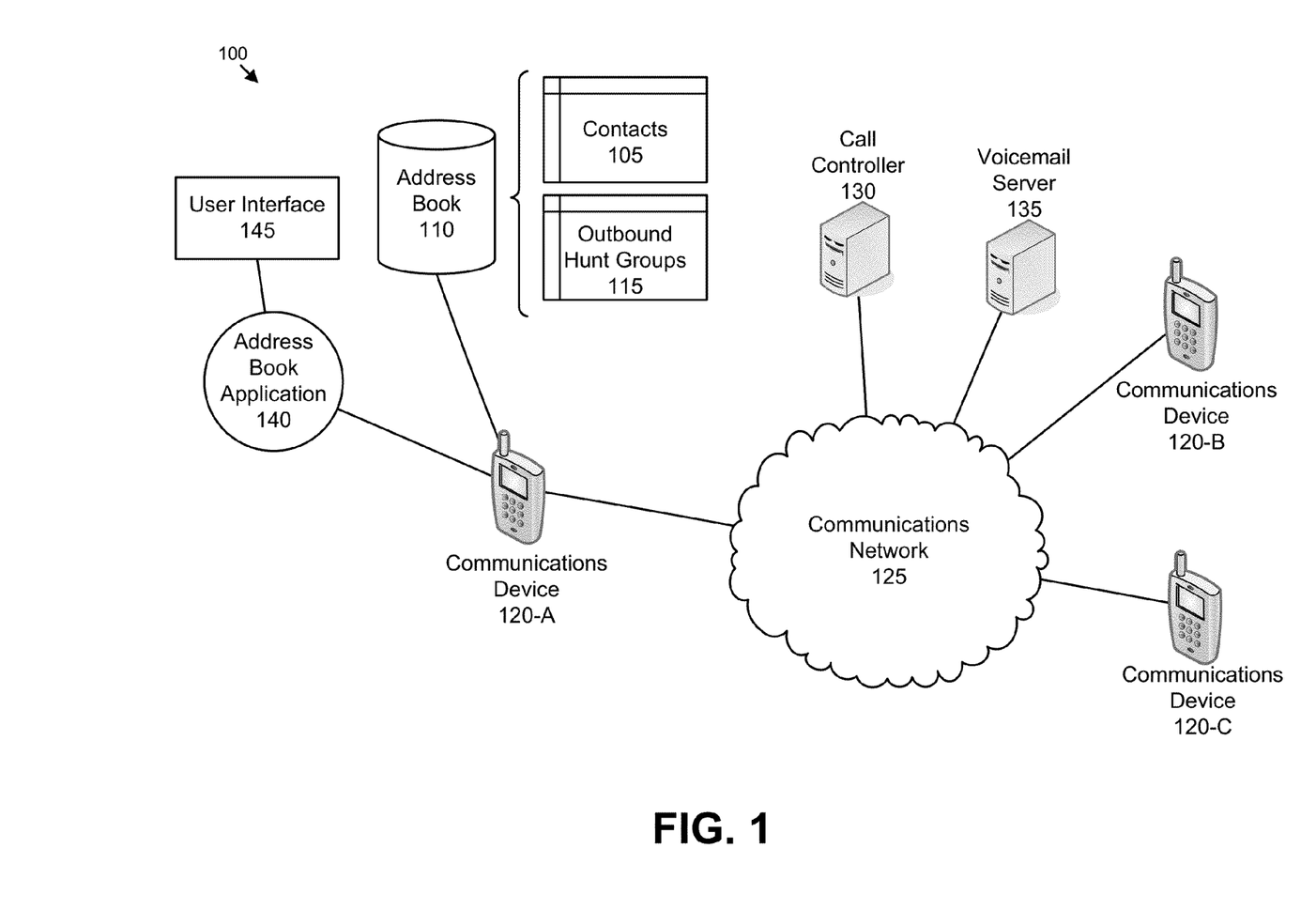
FIG. 1 illustrates an exemplary system for outbound hunt groups.

FIG. 1 illustrates an exemplary system 100 for the creation and use of outbound hunt groups 115. The system 100 may include an address book 110 including a plurality of contacts 105 and one or more outbound hunt groups 115. The system 100 may further include a plurality of communications devices 120 configured to communicate over a communications network 125, such as by utilizing the services of a call controller 130. The system 100 may further include a voicemail server 135 configured to communicate over the communications network 125. The communications devices 120 may be configured to execute an address book application 140, where the application is configured to access the address book 110 and create and use the outbound hunt groups 115 by way of a user interface 145. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

A contact 105 may include data descriptive of a user with which another user may communicate. The contact 105 may accordingly include a name and one or more addresses (e.g., phone numbers, SIP Uniform Resource Identifiers, postal addresses, etc.). An address book 110 may store one or more contacts 105, allowing a user to select a contact 105 from the address book 110 to initiate a communications session with the associated contact 105.

An outbound hunt group 115 may specify a list of contacts 105 from the address book 110 to be called when attempting to reach a particular user. The outbound hunt group 115 may further specify an order in which the listed contacts 105 may be called. As opposed to a traditional hunt group designed to distribute phone calls received by a single telephone number, an outbound hunt group 115 may provide a list of addresses to be called in sequence to locate a particular user. As shown, the outbound hunt groups 115 may be stored along with contacts 105 in the address book 110. In other examples, the outbound hunt groups 115 may be stored separately from the address book 110 and/or the contact 105 information.

A communications device 120 is a type of network resource that may serve as a logical network end-point to create, send and/or receive communications. A SIP user agent (UA) is one type of communications device 120, and a SIP phone is one type of SIP UA. Using SIP as an example, a communications device 120 may perform the role of a User Agent Client (UAC), which sends SIP requests, and the User Agent Server (UAS), which receives the requests and returns a SIP response. In some instances, a call controller 130 may set up and manage a communications session such as a telephone call between two or more communications device 120. In other instances, two communications device 120 may set up and manage a communication session between one another without requiring a call controller 130.

The communications network 125 may provide communications services, including packet-switched network services (e.g., Internet access and/or VoIP communication services) to at least one communications device 120. Correspondingly, each communications device 120 on the communications network 125 may have its own unique device identifier which may be used to indicate, reference, or selectively connect to a particular communications device 120 on the communications network 125.

Communications devices 120 may be assigned addresses. As an example, communications devices 120 may be assigned telephone numbers according to the North American Numbering Plan (NANP). As another example, similar to how web resources may be referenced textually by uniform resource locators (URLs), resources accessible by a SIP communications network 125 such as communications devices 120 may be identified by Uniform Resource Identifiers (URIs). The URI scheme used for SIP is "sip:" (or "sips:" for secure transmission), rather than, for example, "http" or "https" as typically used by the HTTP protocol. A typical SIP URI may be of the form: "sip:username:password@host:port". In some examples, communications devices 120 may locally store one or more address books 110 of such addresses, while in other examples the communications devices 120 may access address books 110 stored on a remote server via the communications network 125.

A call controller 130 may be in communication with the communications device 120 via the communications network 125, and may be configured to control communications sessions between the communications devices 120 independently of the media endpoints that actually transmit and receive within communications sessions. As some examples, the call controller 130 may be configured to initiate communications sessions such as SIP sessions, manage endpoint connectivity within communications sessions, manage media type and codec selection for use within communications sessions, and terminate communications sessions.

A voicemail server 135 may also be in communication with the communications devices and the call controller 130, and may be configured to provide messaging services over the communications network 125. The voicemail server 135 may be configured to receive requests for communications sessions when it is determined that a user is unavailable. For example, a communications session may be forwarded from a communications device 120 associated with a user to a mailbox for that user if the communications session is not accepted within a certain amount of time (e.g., number of rings, seconds) or if the communications device 120 indicates it is busy. The voicemail server 135 may be configured to maintain mailboxes for various users, both allowing callers to leave messages for unavailable users in corresponding mailboxes, and further allowing users to retrieve messages left in their associated mailboxes.

The communications device 120 may be implemented as a combination of hardware and software, and may include one or more software applications or processes for causing one or more computer processors to perform the operations of the communications device 120 described herein. A contacts or address book application 140 may be one such application included on the communications device 120, and may be implemented at least in part by instructions stored on one or more non-transitory computer-readable media.

The address book application 140 may be configured to allow a user to access contacts stored in the address book 110, as well as to create, edit, and invoke outbound hunt groups 115. The address book application 140 may further be configured to provide a user interface 145 to allow for the operation and control of its functions by a user of the communications device 120. The address book application 140 may also provide feedback and other output to the user through the user interface 145 to aid the user in making operational decisions with respect to the system 100. The user interface 145 may make use of hardware and layered software included in the communications device 120, such as hardware and software keyboards, buttons, microphones, display screens, touch screens, lights and sound producing devices. Exemplary user interfaces 145 are illustrated in FIGS. 2-7 discussed below in detail.

In general, computing systems and/or devices, such as communications devices 120, call controllers 130 and voicemail servers 135 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
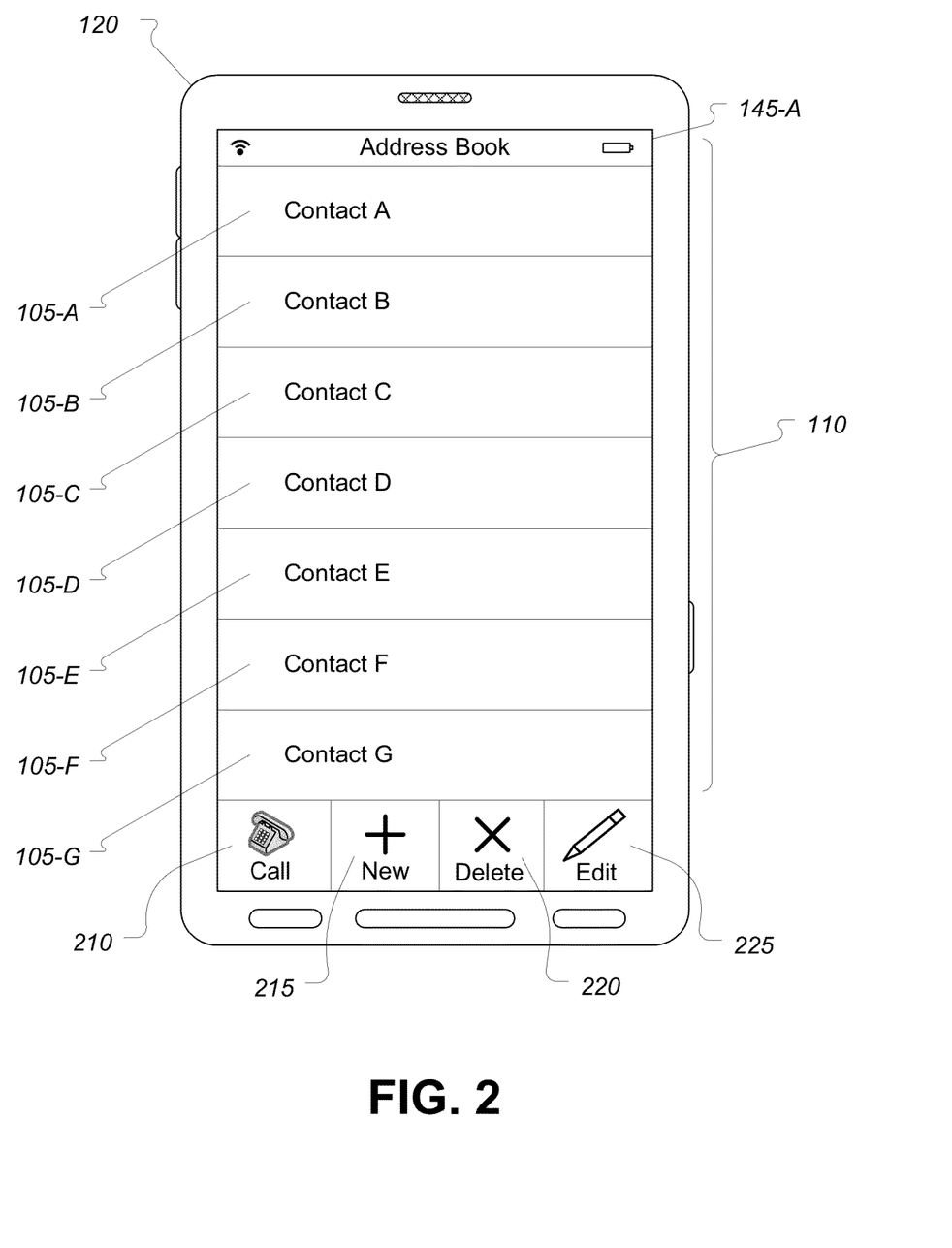
FIG. 2 illustrates an exemplary user interface of a communications device displaying an address book.

FIG. 2 illustrates an exemplary user interface 145-A of a communications device 120 displaying an address book 110 including a plurality of contacts 105-A through 105-G. The user interface 145-A may accordingly provide a user with a graphical representation of the contacts 105 of the user. While seven contacts 105 are illustrated in the exemplary address book 110, address books 110 with more or fewer contacts 105 are possible.

The user interface 145-A may further include additional features to allow users to interact with the contacts 105 of the address book 110. For example, the user interface 145-A may include a call control 210 configured to allow a user to initiate a communications session with a selected contact 105, a new contact control 215 configured to allow a user to create a new contact 105, a delete contact control 220 configured to allow a user to delete a selected contact 105, and an edit control 225 configured to allow a user to edit a selected contact 105.

When editing a contact 105, a user may be able to change the name and address information for the contact 105 being edited. The user may further be able to create, update, or delete an outbound hunt group associated with the contact 105.

Figure 3:
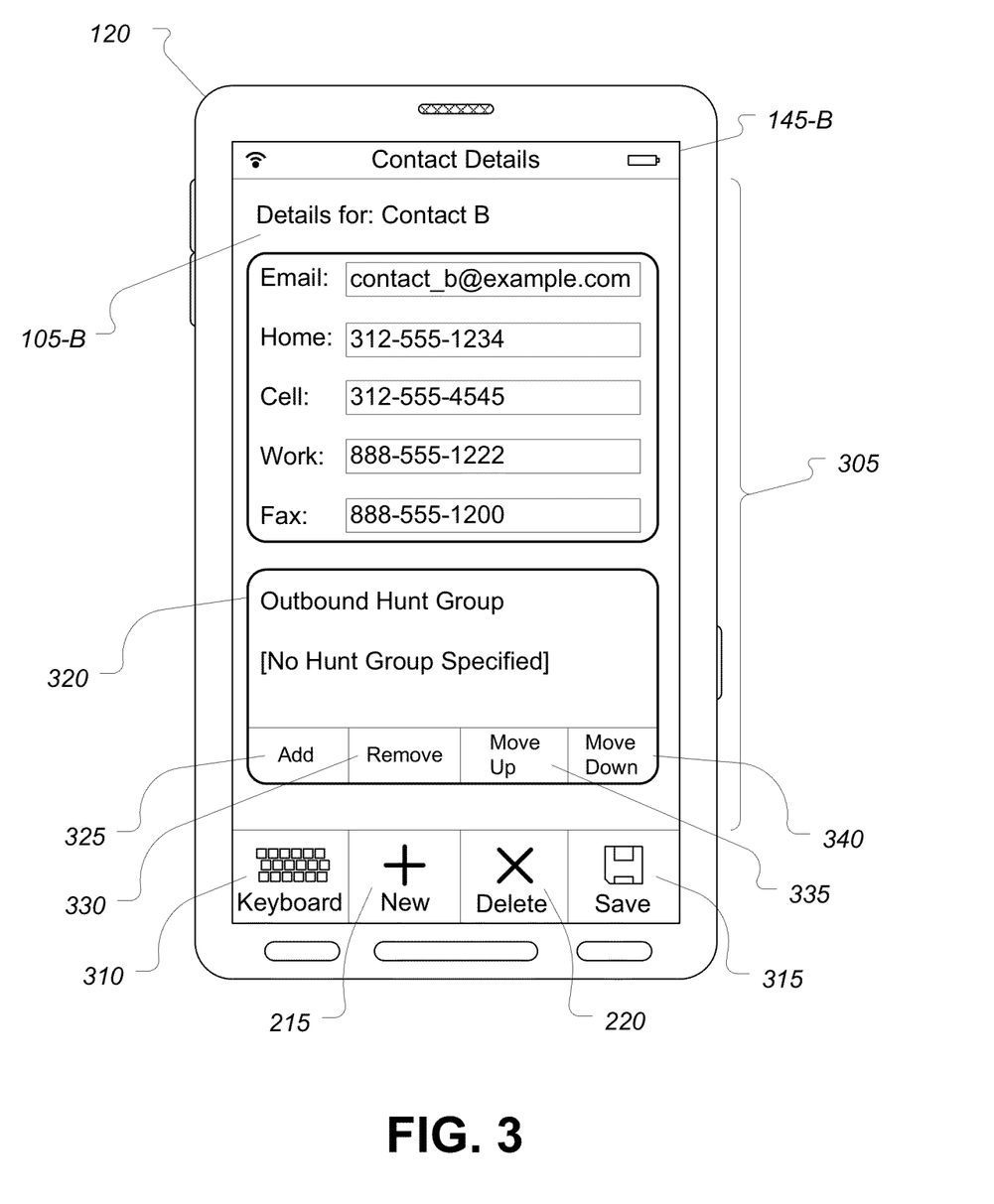
FIG. 3 illustrates an exemplary user interface of a communications device displaying contact details of a contact including outbound hunt group details of an outbound hunt group.

FIG. 3 illustrates an exemplary user interface 145-B of a communications device 120 displaying contact details 305 of a contact 105 including outbound hunt group details 320 of an outbound hunt group 115.

The contact details 305 may include one or more addresses associated with the contact 105 being displayed. As some examples, the contact details 305 may include one or more e-mail addresses, and one or more phone numbers such as home, cellular, work, and facsimile machine (FAX). The user interface 145-B may further include additional features to allow users to interact with the contact 105. For example, the user interface 145-B may include a keyboard control 310 configured to allow a user to toggle the display of a software keyboard on the user interface 145-B, a new contact control 215 configured to allow a user to create a new contact 105, a delete contact control 220 configured to allow a user to delete a selected contact 105, and a save control 315 configured to allow a user to save any changes to the selected contact 105.

The outbound hunt group details 320 may be configured to illustrate the names and ordering of contacts 105 that may be called in turn when an outbound hunt group 115 is specified. If no outbound hunt group 115 is set up then the outbound hunt group details 320 may indicate that no outbound hunt group 115 is specified. If an outbound hunt group 115 is specified, however, then the outbound hunt group details 320 may display the outbound hunt group 115 to the user.

The user interface 145-B may further include additional features to allow users to interact with the outbound hunt group 115 of the contact 105. For example, the user interface 145-B may include an add contact control 325 configured to allow a user to add a contact 105 to the outbound hunt group 115, a remove contact control 330 configured to allow a user to remove a selected contact from the outbound hunt group 115, a move up control 335 configured to allow a user to move a selected contact up in the list of contacts 105 of the outbound hunt group 115, and a move down control 340 configured to allow a user to move a selected contact down in the list of contacts 105 of the outbound hunt group 115.

Figure 5:
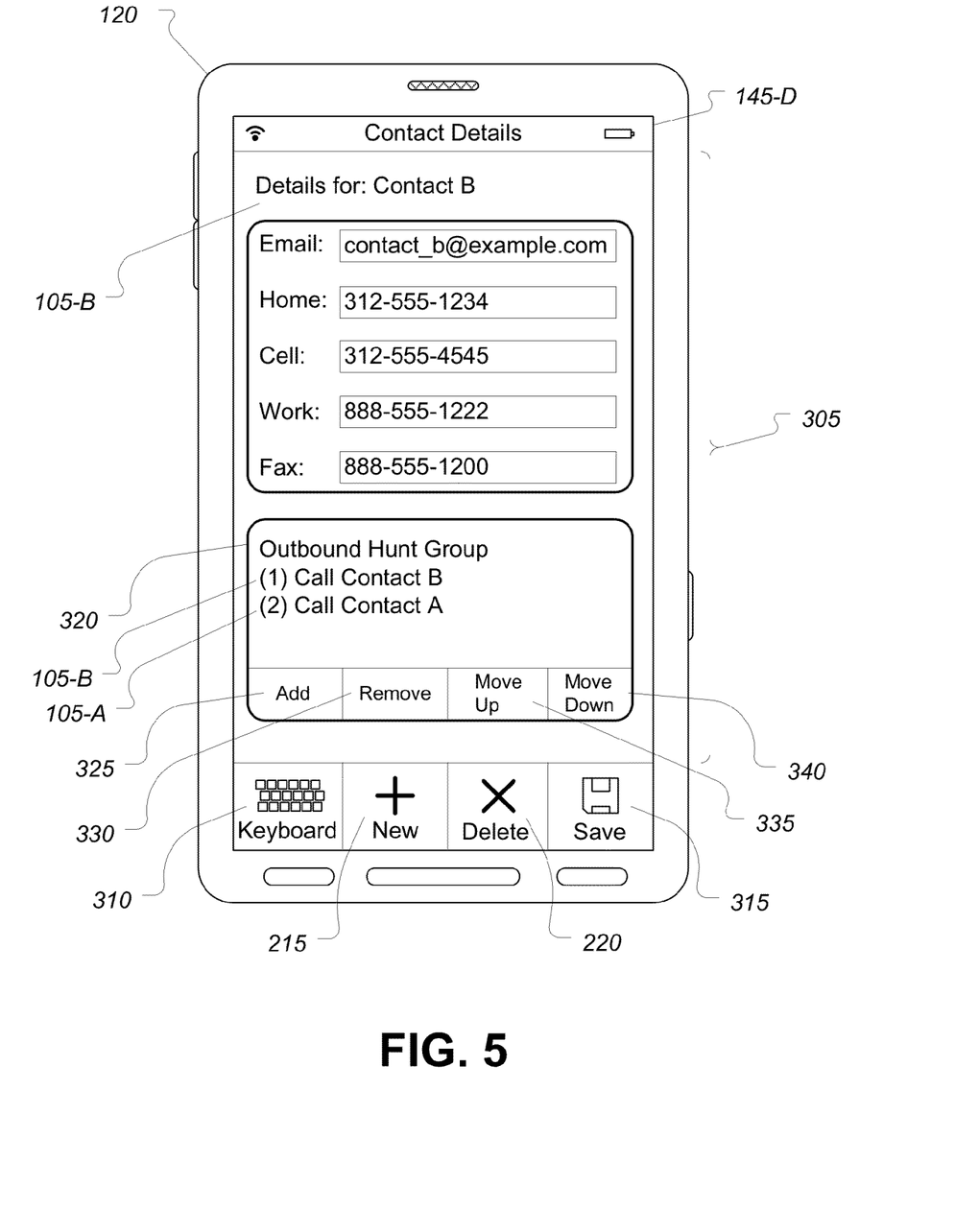
FIG. 5 illustrates an exemplary user interface of a communications device displaying details of a contact including additions to an outbound hunt group.
Figure 7:
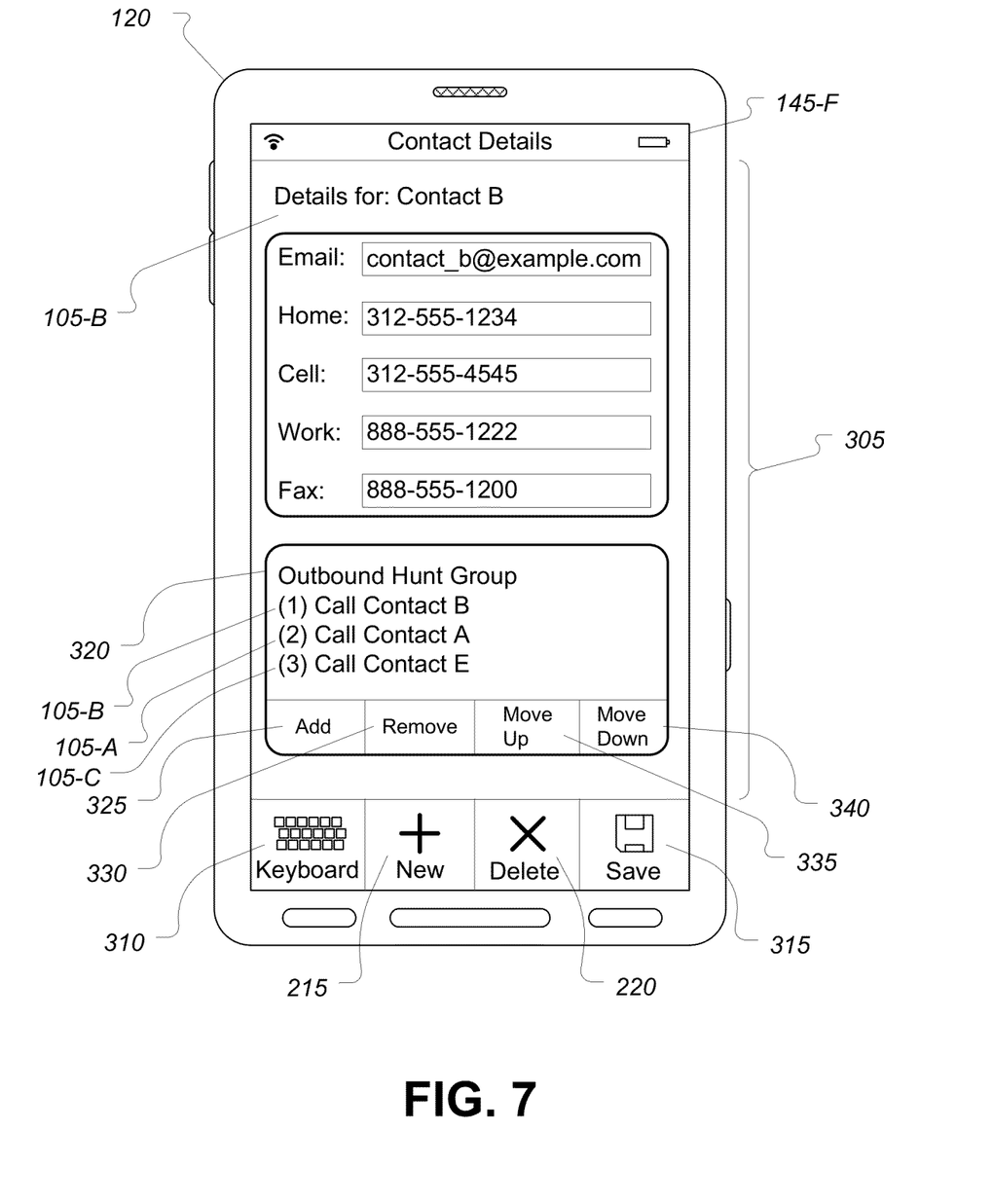
FIG. 7 illustrates an exemplary user interface of a communications device displaying details of a contact including further additions to an outbound hunt group.

As shown in the user interface 145-B no outbound hunt group 115 has been set up. By comparison, user interfaces 145-D and 145-F illustrated in FIGS. 5 and 7 show outbound hunt groups 115 where contacts 105 have been specified, as discussed in detail below. If no outbound hunt group 115 has been set up, a user may select the add contact control 325 to add a contact 105 to the outbound hunt group 115.

Figure 4:
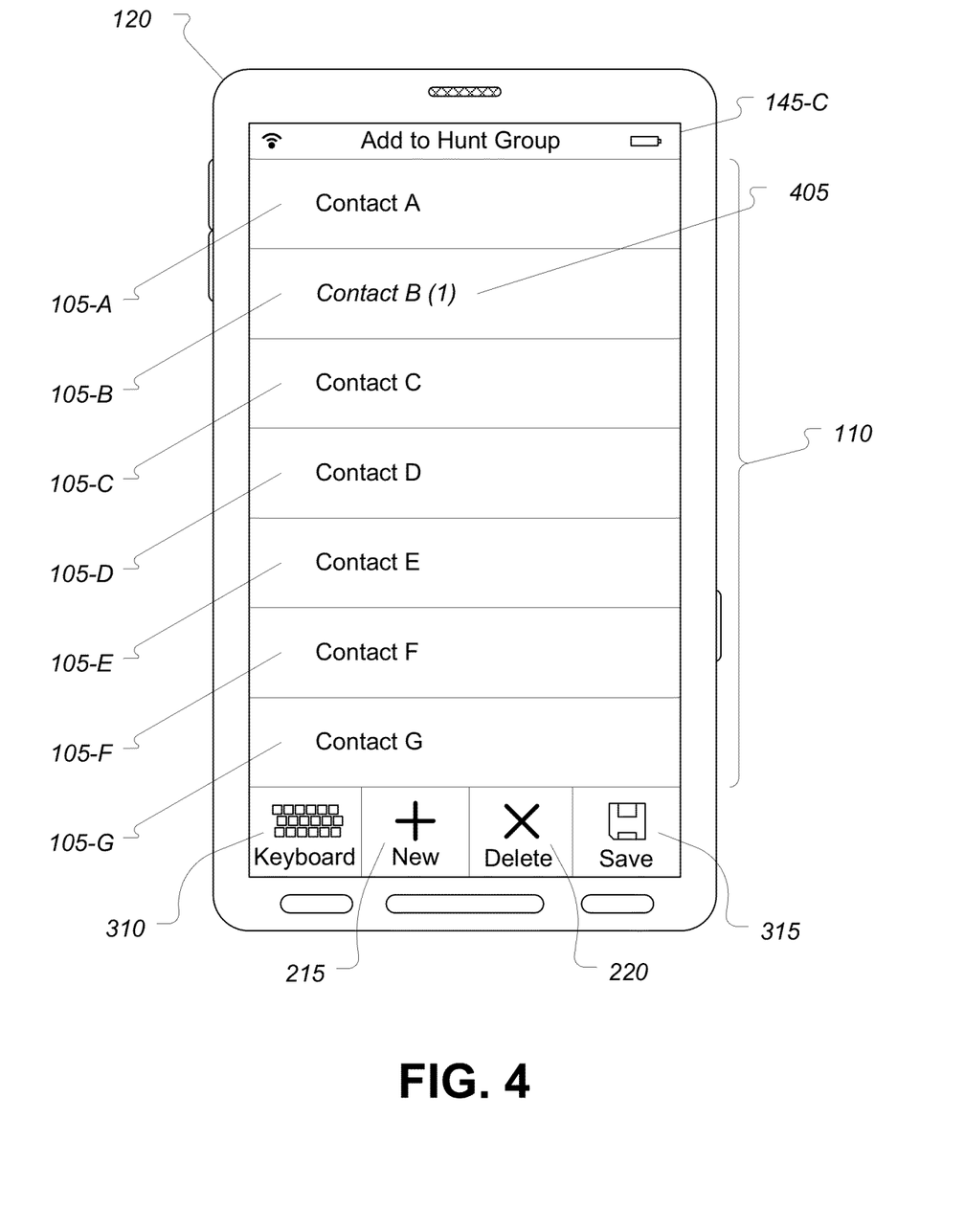
FIG. 4 illustrates an exemplary user interface of a communications device for selection of a contact to add to an outbound hunt group.

FIG. 4 illustrates an exemplary user interface 145-C of a communications device 120 for selection of a contact 105 to add to an outbound hunt group 115. The user interface 145-C may include a listing of the contacts 105 in the address book 110. The user interface 145-C may further include an indication 405 of the contact 105 whose outbound hunt group 115 is being edited. As shown, the indication 405 indicates that the contact B is the item whose outbound hunt group 115 is being edited, and accordingly that the contact B has been automatically selected as being the first contact 105 to be called in the outbound hunt group 115. A user may select a contact 105 from the address book 110, similar to selection of a contact 105 to call or edit as discussed above. Upon selection of a contact 105 from the address book 110, the selected contact 105 may be added to the outbound hunt group 115 associated with the contact 105 being edited.

FIG. 5 illustrates an exemplary user interface 145-D of a communications device 120 displaying details of a contact 105 including additions to an outbound hunt group 115. Continuing with the example from user interfaces 145-B and 145-C, a user may have selected to add to the outbound hunt group 115 for the contact 105-B using user interface 145-B, and may further have selected contact A from the address book 110 using user interface 145-C. Accordingly, user interface 145-D displays an updated outbound hunt group 115 indicated that first contact 105-B is to be called first, and that second contact 105-A is to be called if contact 105-B does not respond.

Figure 6:
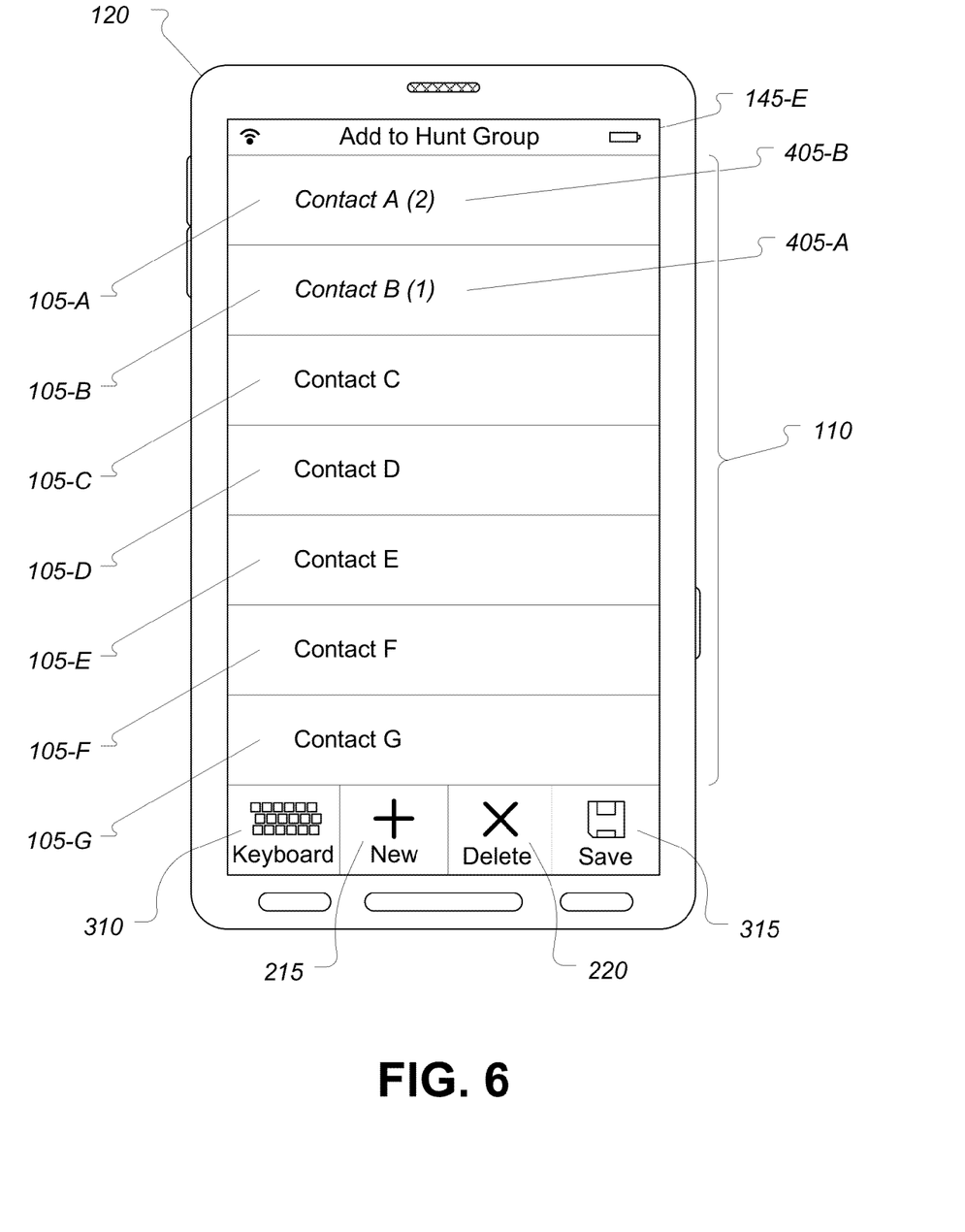
FIG. 6 illustrates an exemplary user interface of a communications device for selection of a contact to add to an outbound hunt group including two contacts.

FIG. 6 illustrates an exemplary user interface 145-E of a communications device 120 for selection of an additional contact 105 to add to an outbound hunt group 115. Similar to as discussed above with respect to the user interface 145-C, the user interface 145-E may include a listing of the contacts 105 in the address book 110. The user interface 145-E may further include indications 405-A and 405-B of the contacts 105 already a part of the outbound hunt group 115, as well as the relative ordering of the contacts 105 within the outbound hunt group 115.

FIG. 7 illustrates an exemplary user interface 145-F of a communications device 120 displaying details of a contact 105 including a further addition to an outbound hunt group 115. Continuing with the example from user interfaces 145-B through 145-E, a user may have selected to add contact E to the outbound hunt group 115 for the contact 105-B using user interface 145-E. As illustrated, the exemplary outbound hunt group 115 now includes contact E in sequence after contact A.

Figure 8:
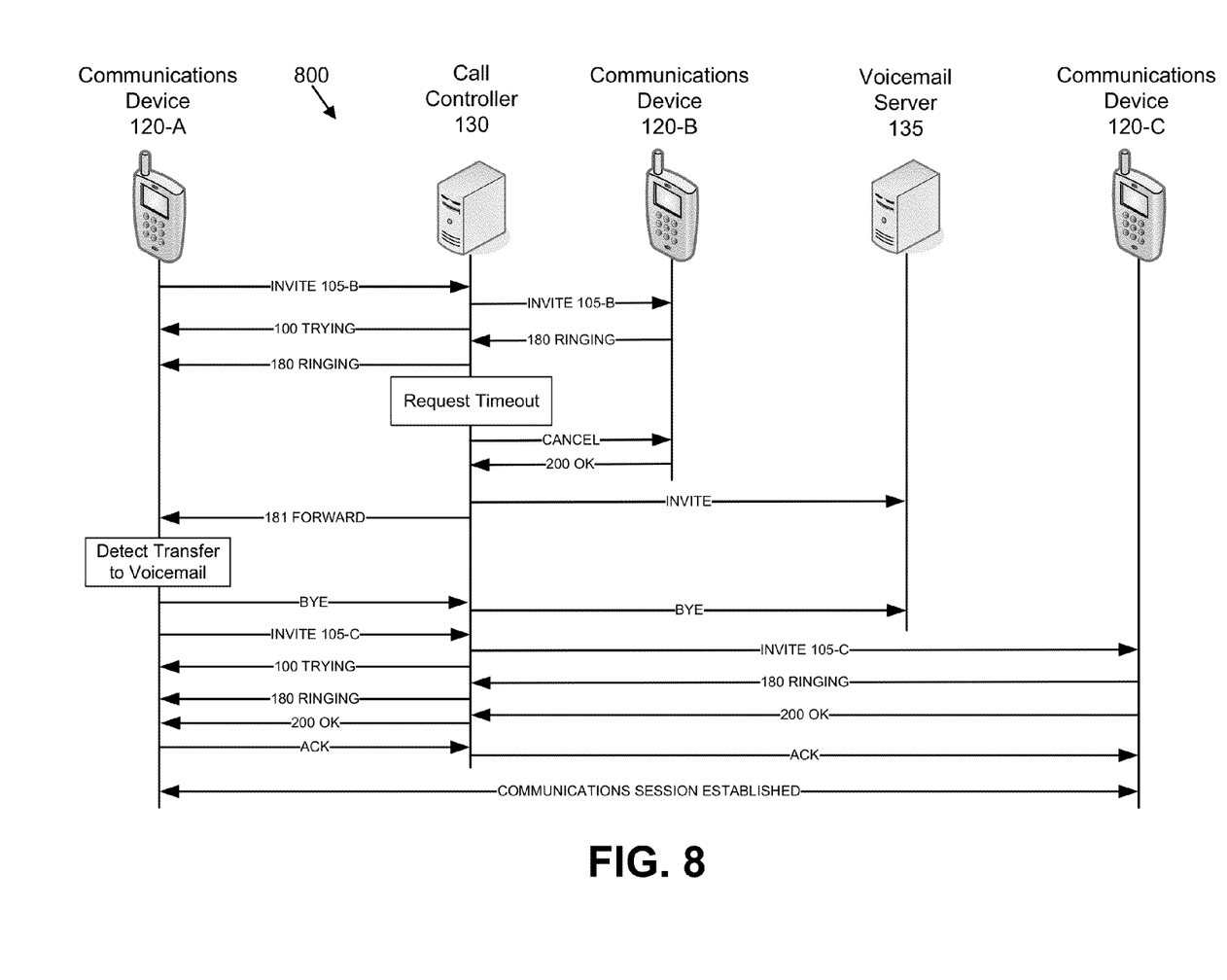
FIG. 8 illustrates an exemplary SIP call flow diagram illustrating a possible execution of an outbound hunt group associated with a contact in the address book of a communications device.

FIG. 8 illustrates an exemplary SIP call flow diagram 800 illustrating a possible execution of an outbound hunt group 115 associated with a contact 105 in the address book 110 of a communications device 120-A. The outbound hunt group 115 may be associated with a contact 105 for the user of communications device 120-B and may list the addresses of communications device 120-B and communications device 120-C. The call flow diagram 800 accordingly illustrates exemplary SIP signaling that may occur when a communications device 120-A attempts to reach a contact 105 using an outbound hunt group 115 and the services of call controller 130. In the example, the communications device 120-A first attempts to reach the contact 105 by attempting to establish a communications session with communications device 120-B. However, the user of communications device 120-B fails to answer and the call is transferred to voicemail server 135. The communications device 120-A disconnects from the voicemail server 135, and proceeds to attempt to reach the second contact 105 of the outbound hunt group 115, communications device 120-C. A communications session is then established with communications device 120-C.

More specifically, upon receiving an indication from the user to initiate a communications session with a contact 105, the communications device 120-A may obtain the outbound hunt group 115 associated with the contact 105. The communications device 120-A may further retrieve the first address from the obtained outbound hunt group 115, and may send a SIP invite message to a call controller 130, the SIP invite message specifying the first address. For sake of explanation, the first address listed in the outbound hunt group 115 is the address of the communications device 120-B.

The call controller 130 may receive the invite message from the communications device 120-A and may forward the invite to the communications device 120-B. The call controller 130 may further send a trying SIP message to the communications device 120-A. When the call controller 130 receives a ringing SIP message from the communications device 120-B, the call controller 130 may further send a ringing SIP message to the communications device 120-A.

In the exemplary scenario, the communications device 120-B fails to answer the invite message within a timeout period, and the request times out. This may occur, for example, if the user of the communications device 120-B is unable or unwilling to respond. The call controller 130 likewise sends a cancel message to the communications device 120-B. The communications device 120-B may accordingly respond to the cancel message with an OK message.

In other examples, rather than the communications device 120-B failing to answer, the communications device 120-B may explicitly send a SIP message to the call controller 130 rejecting the communications session, such as a SIP 486 Busy message.

In response to the communications device 120-A being unavailable, unresponsive, or busy, the call controller 130 may forward the call on to a voicemail server 135 to allow the user of communications device 120-A to leave a message in the mail box of the user of communications device 120-B. The call controller 130 may further send a 181 message to the communications device 120-A informing it of the call transfer. The communications device 120-A may receive the 181 message, and may likewise determine to terminate the call with the voicemails server 135, and may send a BYE message to the call controller 130. The call controller 130 may further send a BYE message to the voicemail server 135.

As a communications session could not be established with communications device 120-B, the communications device 120-A may further proceed to attempt to establish a communications session with the next contact 105 in the outbound hunt group 115. The communications device 120-A may accordingly send a SIP invite message to the call controller 130 specifying the second address listed in the outbound hunt group 115, namely the address of the communications device 120-C as used in the example.

The call controller 130 may receive the invite message from the communications device 120-A and may forward the invite to the communications device 120-C. The call controller 130 may further send a trying SIP message to the communications device 120-A. When the call controller 130 receives a ringing SIP message from the communications device 120-C, the call controller 130 may further send a ringing SIP message to the communications device 120-A.

The communications device 120-C may answer the call, and may send a 200 OK SIP message to the call controller 130 informing it that the call is accepted. The call controller 130 may further send the 200 OK message to the communications device 120-A, which may acknowledge the OK message. The call controller 130 may further forward the acknowledgement from the communications device 120-A to the communications device 120-C.

At this point, the communications device 120-A and the communications device 120-C may establish a communications session between one another. The user of the communications device 120-A may accordingly ask the user of the communications device 120-C regarding the whereabouts of the user of communications device 120-B.

In other examples, the communications device 120-C may also be unavailable, unresponsive, or busy. In such an example, if there are additional addresses in the outbound hunt group 115, the communications device 120-A may similarly attempt to establish communications sessions with the additional addresses, following the sequence of the outbound hunt group 115.

If the communications device 120-A completes the entire outbound hunt group 115 without locating the user to be contacted, then the communications device 120-A may display a message indicating that the user could not be located. As another possibility, the communications device 120-A could establish a communications session with the voicemail server 135 to allow the user to leave a message for the user to be contacted. As additional possibilities, after completing the outbound hunt group 115, the communications device 120-A may make one last attempt to establish a communications session with the contact 105, or may simply continue looping through the outbound hunt group 115 until an answer is achieved.

Figure 9:
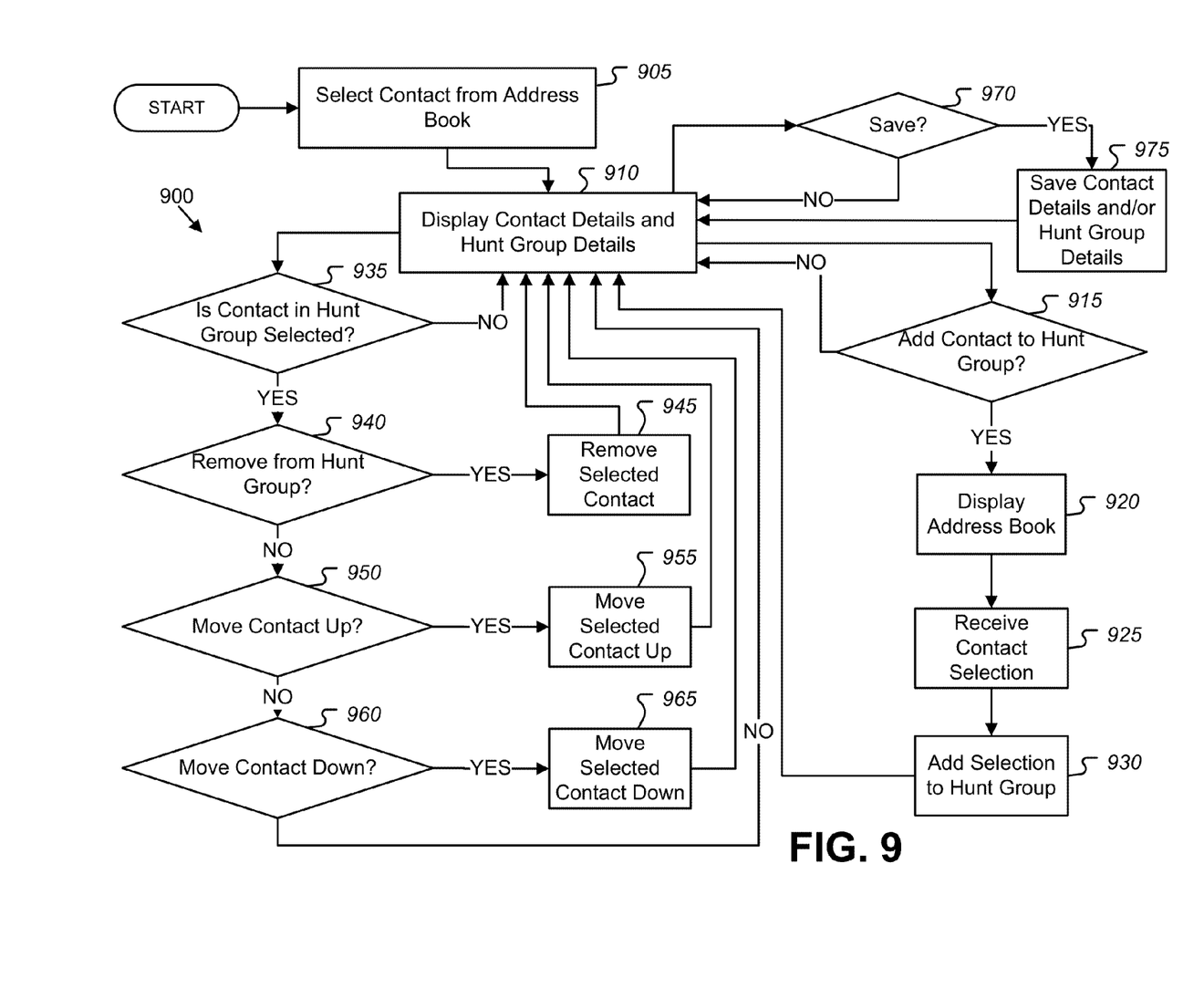
FIG. 9 illustrates an exemplary process for the editing of an outbound hunt group.

FIG. 9 illustrates an exemplary process 900 for the editing of an outbound hunt group 115. The process 900 may be performed by various devices, such as a communications device 120 of the system 100 executing an address book application 140.

In block 905, the communications device 120 receives a selection of a contact 105 from an address book 110. In some examples, communications devices 120 may store one or more address books 110, while in other examples the communications devices 120 may access remotely-stored address books 110 via the communications network 125. Regardless of location, the communications device 120 may access and display the address book 110 in a user interface 145 by using the address book application 140. The communications device 120 may receive a selection of a contact 105 of an address book 110 from the user interface 145, such as illustrated above in user interface 145-A.

In block 910, the communications device 120 displays the contact 105 details and outbound hunt group 115 details in the user interface 145. For example, the user interface 145 may include outbound hunt group details 320 configured to illustrate the names and ordering of contacts 105 to be called in sequence when the outbound hunt group 115 is specified. If no outbound hunt group 115 is set up, then the outbound hunt group details 320 may indicate that no outbound hunt group 115 is specified.

In decision point 915 the communications device 120 determines whether to add a contact 105 to the outbound hunt group 115. For example, the user interface 145 may include an add contact control 325 configured to allow a user to add a contact 105 to the outbound hunt group 115. If the user selects the add contact control 325, then the communications device 120 determines that a contact 105 is to be added to the outbound hunt group 115 and control passes to block 920. Otherwise, control passes to block 910.

In block 920, the communications device 120 displays the address book 110. For example, similar to as illustrated in user interface 145-C or user interface 145-E, the communications device 120 may display a listing of the contacts 105 in the address book 110. The user interface 145 may further include an indication 405 of the contact 105 whose outbound hunt group 115 is being edited. The user interface 145 may further include indications 405 of the contacts 105 already a part of the outbound hunt group 115, as well as the placement of the contacts 105 within the outbound hunt group 115.

In block 925, the communications device 120 receives a selection of a contact 105 from the address book 110. For example, a user may select to add a contact 105 to the outbound hunt group 115 using a user interface such as the user interfaces 145-C or the user interface 145-E.

In block 930, the communications device 120 adds the selected contact 105 to the outbound hunt group 115. For example, the outbound hunt group 115 may be updated to further include the contact 105 selected in block 925. The newly added contact 105 may be added at the end of the existing outbound hunt group 115 sequence, the beginning of the existing outbound hunt group 115 sequence, or at a location in the existing outbound hunt group 115 sequence in relation to a current selected address in the list of addresses of the outbound hunt group 115. In some examples, the first contact 105 in the outbound hunt group 115 defaults to the contact 105 whose outbound hunt group 115 is being edited. Next, control passes to block 910.

In decision point 935, the communications device 120 determines whether a contact 105 in the outbound hunt group 115 is selected. For example, a user may select a contact 105 listed in an outbound hunt group details 320 portion of a user interface 145. If so, control passes to decision point 940. Otherwise, control passes to block 910.

In decision point 940, the communications device 120 determines whether to remove a contact 105 from the outbound hunt group 115. For example, a user may select a remove contact control 330 configured to allow a user to remove a selected contact 105 from the outbound hunt group 115. If such a control is selected, then control passes to block 945. Otherwise control passes to decision point 950.

In block 945, the communications device 120 removed the selected contact 105 from the outbound hunt group 115. The user interface 145 may accordingly update the outbound hunt group details 320 to illustrate the removal of the contact 105. Next, control passes to block 910.

In decision point 950, the communications device 120 determines whether to move a selected contact 105 up in placement in the outbound hunt group 115. For example, a user may select a move up control 335 configured to allow a user to move a selected contact up in the list of contacts 105 of the outbound hunt group 115. A user may select such a control to reorder a contact 105 to an earlier position in the outbound hunt group 115 sequence. If such a control is selected, then control passes to block 955. Otherwise control passes to decision point 960.

In block 955, the communications device 120 moves the selected contact 105 up in the outbound hunt group 115 sequence. The user interface 145 may accordingly update the outbound hunt group details 320 to illustrate the revised ordering of contacts 105. Next, control passes to block 910.

In decision point 960, the communications device 120 determines whether to move a selected contact 105 down in placement in the outbound hunt group 115. For example, a user may select a move down control 340 configured to allow a user to move a selected contact down in the list of contacts 105 of the outbound hunt group 115 sequence. A user may select such a control to reorder a contact 105 to a later position in the outbound hunt group 115 sequence. If such a control is selected, then control passes to block 965. Otherwise control passes to block 910.

In block 955, the communications device 120 moves the selected contact 105 down in the outbound hunt group 115 sequence. The user interface 145 may accordingly update the outbound hunt group details 320 to illustrate the revised ordering of contacts 105. Next, control passes to block 910.

In decision point 970, the communications device 120 determines whether to save any changes to the contact 105. For example, the communications device 120 may determine whether any additions, removals, and/or reordering operations were performed on the outbound hunt group 115 when a user selects a save control 315 on the user interface 145. If yes, then control passes to block 975. Otherwise, control passes to block 910.

In block 975, the communications device 120 saves the contact 105 and/or outbound hunt group 115. In some examples, the communications device 120 saves the outbound hunt group 115 as part of the contact 105 in the address book 110. In other examples, the outbound hunt group 115 may be saved separately from the address book 110. Next, control passes to block 910.

Figure 10:
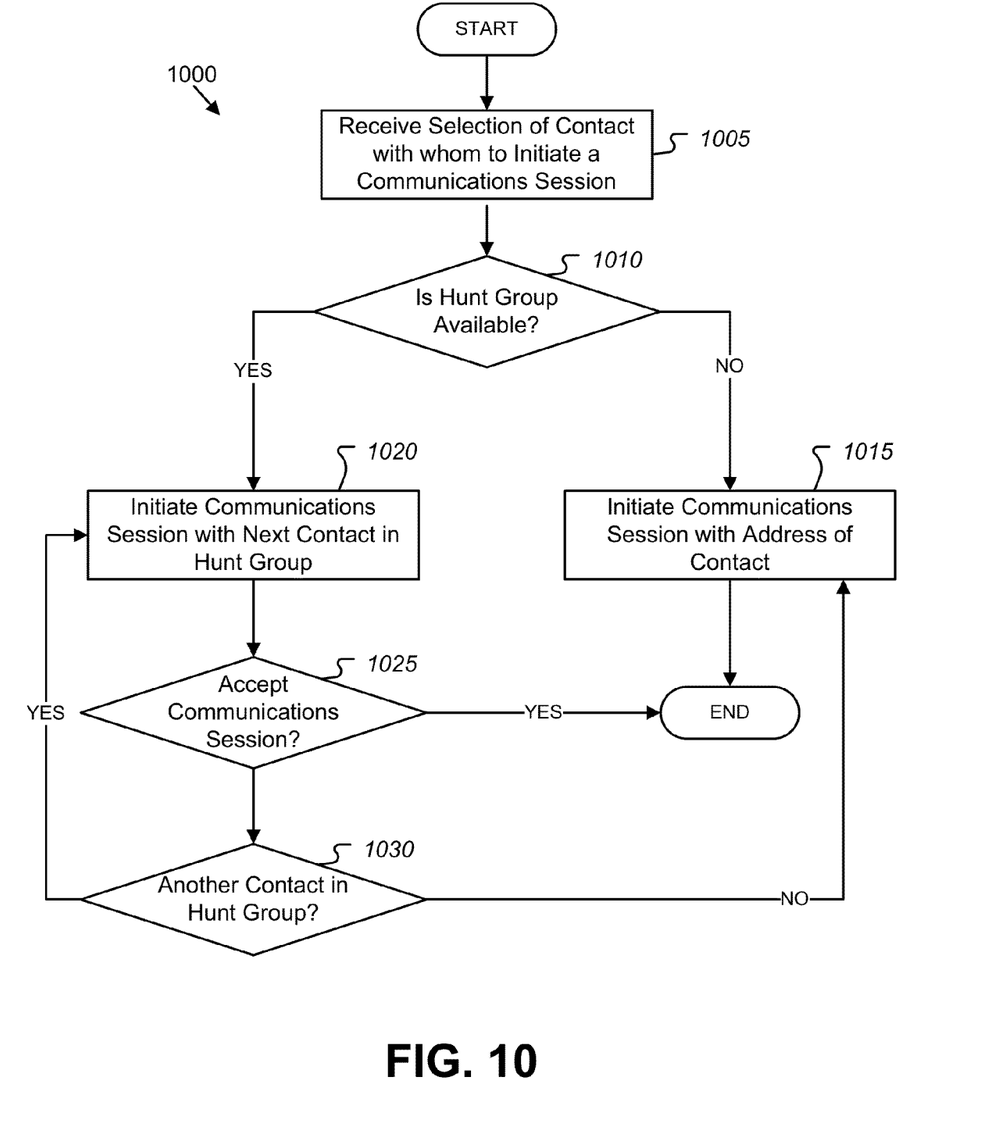
FIG. 10 illustrates an exemplary process for the execution of an outbound hunt group.

FIG. 10 illustrates an exemplary process 1000 for the execution of an outbound hunt group 115. As with the process 900, the process 1000 may be performed by various devices, such as a communications device 120 executing an address book application 140 and/or a call controller 130 of the system 100.

In block 1005, the communications device 120 receives a selection of a contact 105 in the address book 110 with whom the user of the communications device 120 desires to initiate a communications session. For example, a user may select a contact 105 from an address book 110 displayed in the user interface 145 of the communications device 120 by the address book application 140.

In decision point 1010, the communications device 120 determines whether an outbound hunt group 115 is available for the selected contact 105 to be called. If no outbound hunt group 115 is available, block 1015 is executed next. Otherwise block 1020 is executed next.

In block 1015, the communications device 120 attempts to initiate a communications session with the contact 105 without using an outbound hunt group 115. For example, the communications device 120 may attempt to initiate a communications session with an address of the contact 105, such as a phone number or SIP URI. In some cases, the contact 105 may accept the communications session and allow for a communications session to be established between the communications device 120 and the communications device 120 of the contact 105. In other cases, the communication request may be transferred to a voicemail server 135, the communication request may return with an error, among other possibilities. In any case, after block 1015, the process 1000 ends.

In block 1020, the communications device 120 attempts to initiate a communications session with the next contact 105 in the outbound hunt group 115. For example, as illustrated in details in the call flow diagram 800, the communications device 120 may send an invite message to a call controller 130 which in turn is configured to invite the next contact 105 in the sequence of the outbound hunt group 115 to a communications session.

In decision point 1025, the communications device 120 determines whether the contact 105 accepts the request for a communications session with the communications device 120. For example, as illustrated in details in the call flow diagram 800, the communications device 120 of the contact 105 may send an OK message indicating acceptance of the invite message. In other examples, the communications device 120 of the contact 105 may send a message rejecting the request to establish a communications session, or may fail to respond within a timeout period. If the communications device 120 determines that the contact 105 accepts the request for a communications session with the communications device 120, a communications session may be established between the communications device 120 and the communications device 120 of the contact 105 and the process 1000 ends. Otherwise, control passes to decision point 1030.

In decision point 1030, the communications device 120 determines whether the outbound hunt group 115 includes an additional contact 105 in the outbound hunt group 115 sequence. If so, control passes to block 1020. Otherwise, control passes to block 1015.

It should be noted that variations on the process 1000 are possible. As an example, the communications device 120 may loop through the outbound hunt group 115 more than once, or loop until a timer expired. As another example, rather than passing control to block 1015, the process 100 may end if there are no additional contacts in the outbound hunt group 115.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a wireless mobile communications device configured to:
   select a first contact entry from an address book, the first contact entry including information descriptive of a first contact and including at least one address of the first contact,
   associate an outbound hunt group with the first contact, the outbound hunt group configured to provide a list of addresses to be called in sequence to locate the first contact, and
   in response to receiving a request to initiate a communications session with the first contact after the outbound hunt group has been associated therewith:
   the wireless mobile communications device automatically transmits
   a call-request-message to a call controller, the call-request-message requesting establishment of a communications session with a first address in the list of addresses to be called in sequence in the outbound hunt group associated with the first contact,
   the wireless mobile communications device automatically monitors
   for receipt of a forwarding-message from the call controller, which indicates that the communications session with the first address was forwarded to voicemail; and
   when the forwarding-message is received from the call controller, in response to receiving the forwarding message, the wireless mobile communications device automatically transmits to the call controller, before a voicemail is left, a terminate message that causes the call controller to terminate the communications session forwarded to voicemail and automatically transmits a second call-request-message to the call controller, the second call-request-message requesting establishment of a communications session with a second address in the list of addresses to be called in sequence in the outbound hunt group associated with the first contact.

2. The system of claim 1, wherein the wireless mobile communications device includes a user interface configured to display the list of addresses to be called in sequence.

3. The system of claim 1, wherein the wireless mobile communications device is further configured to:
receive a request to add an address to the outbound hunt group;
display the address book responsive to the request;
receive from the address book a selection of a second contact to be added to the outbound hunt group; and
add the second contact to the outbound hunt group.

4. The system of claim 3, wherein the second contact is added to one of: the end of the sequence of addresses of the outbound hunt group, the beginning of the sequence of addresses of the outbound hunt group, and at a location in the sequence of addresses of the outbound hunt group in relation to a current selected address in the outbound hunt group.

5. The system of claim 1, wherein the wireless mobile communications device is further configured to at least one of:
remove a selected address from the outbound hunt group;
move a selected address up in sequence in the list of addresses of outbound hunt group; and
move a selected address down in sequence in the list of addresses of outbound hunt group.

6. The system of claim 1, wherein the wireless mobile communications device is further configured to:
receive a request to initiate a communications session with a second contact in the address book;
in response to the request to initiate the communications session with the second contact:
the wireless mobile communications device automatically determines
whether an outbound hunt group associated with the second contact is available; and
when an outbound hunt group associated with the second contact is available, the wireless mobile communications device automatically initiates location of the second contact using the outbound hunt group associated with the second contact.

7. The system of claim 6, wherein the wireless mobile communications device is further configured to, in response to the request to initiate the communications session with the second contact, when it is determined that no outbound hunt group associated with the second contact is available, automatically initiate a communications session with an address included in the second contact.

8. The system of claim 6, wherein the wireless mobile communications device is further configured to, in response to the request to initiate the communications session with the second contact, when it is determined that an outbound hunt group associated with the second contact is available:
the wireless mobile communications device automatically initiates a communications session with a first address in the list of addresses to be called in sequence in the outbound hunt group associated with the second contact;
the wireless mobile communications device determines whether the communications session with the first address was accepted; and
when the communications session with the first address was not accepted, the wireless mobile communications device automatically initiates a communications session with a second address in the list of addresses to be called in sequence in the outbound hunt group associated with the second contact.

9. The system of claim 8, wherein the wireless mobile communications device is further configured to:
determine whether the communications session was accepted with the second address; and
when the communications session was not accepted, initiate a communications session with a third address in the list of addresses to be called in sequence in the outbound hunt group associated with the second contact.

10. The system of claim 8, wherein the communications session is determined to be not accepted when at least one of:
it is detected that the communications session was forwarded to voicemail, and
a message is received indicating that a device associated with the first address in the list of addresses is unavailable.

11. The system of claim 8, wherein the wireless mobile communications device is further configured to:
determine that the outbound hunt group associated with the second contact does not include any additional addresses list of addresses to be called in sequence to locate the second contact; and
initiate a communications session with an address included in the second contact.

12. A non-transitory computer-readable medium storing a software program, the software program being configured to, when executed by a processor, cause the processor to perform operations comprising:
receiving a selection of a first contact entry from a user interface displaying an address book, the first contact entry including information descriptive of a first contact and including at least one address of the first contact;
associating an outbound hunt group with the first contact, the outbound hunt group configured to provide a list of addresses to be called in sequence to locate the first contact, and
in response to receiving a request to initiate a communications session with the first contact after the outbound hunt group has been associated therewith:
the processor automatically transmitting a call-request-message to a call controller, the call-request-message requesting establishment of a communications session with a first address in the list of addresses to be called in sequence in the outbound hunt group associated with the first contact,
the processor automatically monitoring for receipt of a forwarding-message from the call controller that indicates that the communications session with the first address was forwarded to voicemail; and
when the forwarding-message is received form the call controller, in response to receiving the forwarding message, the processor automatically transmitting to the call controller, before a voicemail is left, a terminate message that causes the call controller to terminate the communications session forwarded to voicemail and automatically transmitting a second call-request-message to the call controller, the second call-request-message requesting establishment of a communications session with a second address in the list of addresses to be called in sequence in the outbound hunt group associated with the first contact.

13. The computer-readable medium of claim 12, wherein the operations further comprise:
receiving a request to initiate a communications session with a second contact in the address book;
in response to the request to initiate the communications session with the second contact:
the processor automatically determining whether an outbound hunt group associated with the second contact is available; and
when an outbound hunt group associated with the second contact is available, the processor automatically initiating location of the user using the list of addresses of the outbound hunt group associated with the second contact.

14. The computer-readable medium of claim 13, wherein the operations further comprise automatically initiating a communications session with an address included in the second contact when it is determined that no outbound hunt group associated with the contact is available.

15. The computer-readable medium of claim 13, wherein the operations further comprise, in response to the request to initiate the communications session with the second contact, when it is determined that an outbound hunt group associated with the contact is available:
   the processor automatically initiating a communications session with a first address in the list of addresses to be called in sequence in the outbound hunt group;
   the processor automatically determining whether the communications session with the first address was accepted;
   when the communications session with the first address was not accepted, the processor automatically initiating a communications session with a second address in the list of addresses to be called in sequence in the outbound hunt group;
   the processor automatically determining whether the communications session with the second address was accepted;
   when the communications session with the second address was not accepted, the processor initiating a communications session with a third address in the list of addresses to be called in sequence in the outbound hunt group; and
   when any of the communication sessions are accepted, the processor automatically ceasing further attempts to initiate communications sessions using the outbound hunt group.

16. The computer-readable medium of claim 12, wherein the operations further comprise:
   receiving a request to add an address to the outbound hunt group;
   displaying the address book responsive to the request;
   receiving from the address book a selection of a second contact to be added to the outbound hunt group associated with the first contact; and
   adding the selected second contact to the outbound hunt group associated with the first contact.

17. The computer-readable medium of claim 16, wherein the operations further comprise:
   adding the selected contact to one of: the end of the sequence of addresses of the outbound hunt group, the beginning of the sequence of addresses of the outbound hunt group, and at a location in the sequence of addresses of the outbound hunt group in relation to a current selected address in the outbound hunt group.

18. The computer-readable medium of claim 12, wherein the operations further comprise at least one of:
   removing a selected address from the outbound hunt group;
   moving a selected address up in sequence in the list of addresses of outbound hunt group; and
   moving a selected address down in sequence in the list of addresses of outbound hunt group.

19. A wireless mobile communications device including a processor and a memory storing processor-executable program code configured to, when executed by the processor, cause the wireless mobile communications device to perform operations comprising:
   displaying an address book for initiating communications with contacts, the address book including entries that are selectable by the user and that each correspond to one of the contacts and include at least one address of the corresponding contact;
   associating an outbound hunt group with a given contact, the outbound hunt group providing a list of ones of the contacts to be called in sequence to locate the given contact,
   in response to a user selection to call the given contact received after the outbound hunt group has been associated with the given contact:
      the processor automatically initiating a call to an address of a first one of the contacts in the list of contacts in the outbound hunt group by transmitting a call-request-message to a call controller,
      the processor automatically determining whether the call to the address of the first one of the contacts has been forwarded to voicemail by monitoring for receipt of a forwarding-message from the call controller, and
      when the call was forwarded to voicemail, the processor automatically terminating the call forwarded to voicemail before a voicemail is left by transmitting a terminate message to the call controller, and automatically initiating a call to an address of a second one of the contacts in the list of contacts in the outbound hunt group by transmitting a second call-request-message to the call controller.

20. The wireless mobile communications device of claim 19, wherein the operations further include:
   in response to a user request to add a contact to the outbound hunt group:
   displaying the address book, and
   in response to a user selection of one of the entries included in the displayed address book, adding the contact corresponding to the selected entry to the outbound hunt group.

21. The wireless mobile communications device of claim 19, wherein the operations further comprise:
   in response to a user selection to call any one of the contacts:
      the processor automatically determining whether an outbound hunt group is associated with the selected contact,
      when no outbound hunt group is associated with the selected contact, the processor automatically calling an address of the selected contact,
      when an outbound hunt group is associated with the selected contact, the processor automatically initiating a hunt group calling process based on the outbound hunt group associated with the selected contact.

* * * * *